United States Patent
Lin et al.

(10) Patent No.: US 7,330,450 B1
(45) Date of Patent: Feb. 12, 2008

(54) WIRELESS NETWORK DETECTION DEVICE

(75) Inventors: Frank Lin, Diamond Bar, CA (US); Dan Wang, Irvine, CA (US); Frank Hung, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 11/246,653

(22) Filed: Oct. 7, 2005

(51) Int. Cl.
*H04Q 7/32* (2006.01)
*H04Q 7/20* (2006.01)

(52) U.S. Cl. .............. 370/334; 370/332; 370/331; 370/329; 370/346; 370/343; 370/340; 370/341; 455/550.1; 455/553.1; 455/575.1; 455/78; 455/551; 455/422.1; 455/403

(58) Field of Classification Search .......... 370/334, 370/332, 331, 329, 328, 346, 343, 340, 341; 455/552.1, 553.1, 550.1, 466, 434, 422.1, 455/403, 500, 517, 414.1, 414.2, 414.3, 414.4, 455/575.1, 556.1, 556.2, 78, 88, 551, 67.11, 455/422, 423, 424, 425, 65, 69
See application file for complete search history.

(56) References Cited

U.S. PATENT DOCUMENTS

| | | | |
|---|---|---|---|
| 5,940,760 A * | 8/1999 | Uistola | 455/434 |
| 5,966,667 A * | 10/1999 | Halloran et al. | 455/552.1 |
| 6,169,733 B1 * | 1/2001 | Lee | 370/342 |
| 6,836,663 B1 * | 12/2004 | Kotzin | 455/445 |
| 2003/0204748 A1 * | 10/2003 | Chiu | 713/201 |
| 2004/0162105 A1 * | 8/2004 | Reddy et al. | 455/551 |
| 2005/0202841 A1 * | 9/2005 | Brobston et al. | 455/552.1 |
| 2006/0229100 A1 * | 10/2006 | Born | 455/557 |

OTHER PUBLICATIONS

"802.11b/g WiFi Locator", Hawking Technology (pp. 2).
"Canary Wireless Launches First Digital Wi-Fi Detector with LCD", Canary Wireless, http://www.canarywireless.com/release1.html, Nov. 2004 (pp. 3).
Bob Rudis, "Pocket-Sized Wireless Detection", Security Focus, http://www.securityfocus.com/infocus/1727; Dec. 2006 (pp. 4).

* cited by examiner

*Primary Examiner*—Keith Ferguson
(74) *Attorney, Agent, or Firm*—MacPherson Kwok Chen & Heid LLP; Tom Chen

(57) ABSTRACT

A device for determining network parameters may include one or more antennae and a processor. For example, the device may include multiple antennae so that direction information for one or more wireless network sources may be determined. Network parameters may include security information for the network, network name information, and/or other information. The processor included in the device may not be configured to transmit and receive information on an information communication connection with the wireless network source(s); for example, the device may be a stand-alone device separate from a user device (such as a personal computer) configured to transmit and receive information on an information communication connection with the wireless network source(s). In other embodiments, the device may be at least partially integrated with a user device (e.g., may have a separate processor but be included in a user device housing).

23 Claims, 1 Drawing Sheet

WIRELESS NETWORK DETECTION DEVICE

BACKGROUND

1. Field of Invention

This invention generally relates to detection of wireless networks.

2. Related Art

Wireless networking provides much-needed flexibility and convenience, compared to wired networking. One important feature of wireless networking is the ability to connect to the information infrastructure at locations other than a user's home or office. Wireless networking allows users to work in locations such as libraries, hotels, airports, and the like, depending on the availability of accessible wireless access points.

However, the availability of wireless networking varies widely from location to location. In many locations, no wireless networking is available. In others, a number of wireless networks may be available, with different signal strengths at a particular user location. Additionally, some wireless networks may be secured, and unavailable to some users.

However, a user may have little or no information about available wireless networks, and may need to power-up his computer (or other user device) to use on-board wireless detection mechanisms to determine whether an accessible network is available at his location.

An example of existing network detection methods is as follows. A user who would like to connect to a wireless network turns on his personal computer or other wireless device. After a startup procedure (e.g., after the computer boots up), the device may execute software instructions to search for available wireless networks.

The device may then present a display a number of network parameters, including an identifier for each detected wireless network, one or more indicia of signal strength for each detected wireless network, and a security status for each detected wireless network.

BRIEF DESCRIPTION OF THE DRAWINGS

Like reference symbols in the various drawings indicate like elements.

DETAILED DESCRIPTION

Current techniques for detecting wireless network parameters may not be optimal, in some circumstances. For example, many locations in which a wired connection is not available may also have few or no electrical outlets available for public use. Therefore, it may be counter-productive for a user to power up his wireless networking device only to find that no wireless network is available.

Additionally, for a particular location (e.g., an airport or a library), there may be some regions where the signal strength is low, and some regions where the signal strength is high. For example, a library may have a wireless router or other network access point positioned in a server room of the library, which may be located out of sight of library patrons. Regions of the library close to the server room may receive a relatively high wireless signal from the access point, whereas regions of the library further from the server room may receive a relatively low signal from the access point. Existing techniques may not provide information enabling a user to easily position himself in the high signal regions.

Systems and techniques provided herein may allow for more efficient wireless networking, by providing a wireless network detection device with enhanced capability and improved power consumption.

Figure 1:
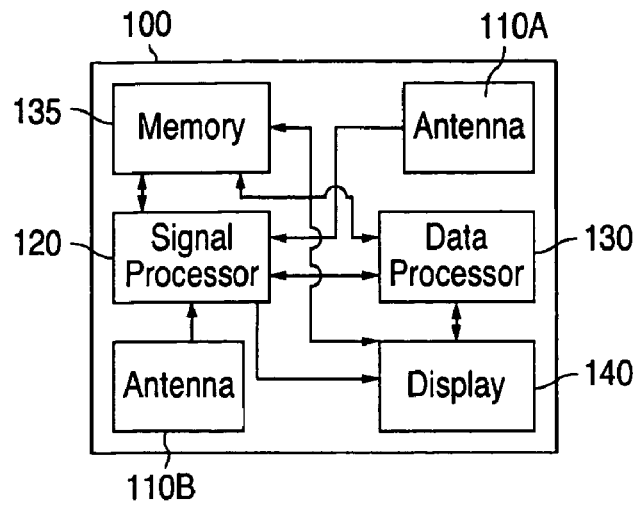
FIG. 1 is schematic diagram of a device to determine one or more wireless networking parameters, according to some embodiments.

FIG. 1 shows a device 100 including a one or more antennae. For example, device 100 may include a first antenna 110A and a second antenna 110B. Antennae 110A and 110B are configured to couple one or more wireless signals into device 100. For example, antennae 110A and 110B may be configured to couple electromagnetic energy having a frequency in the RF regime into device 100. Device 100 may determine one or more wireless network parameters based on the received electromagnetic energy using hardware, software, or a combination of hardware and software.

For example, antennae 110A and 110B may output a signal to signal processor 120. Signal processor 120 may be configured in a number of different ways, in different embodiments. Signal processor 120 may be implemented in one module, or more than one module.

For example, signal processor 120 may be configured to down-convert a received signal from a first frequency to a second, lower frequency. Signal processor 120 may then process the down-converted analog signal to determine one or more wireless network parameters corresponding to the received signal.

In another example, signal processor 120 may be configured to convert a received analog signal to a digital signal, and provide the digital signal to a data processor 130. Data processor 130, which may be a microprocessor, digital signal processor, application specific integrated circuit (ASIC) or other type of data processor, may determine one or more wireless network parameters corresponding to the received signal.

Device 100 may further include a memory 135 (which may be implemented as a single module or more than one memory modules). Memory 135 may store instructions to be executed using data processor 130, and may store data to be used by data processor 130.

Data processor 130 and/or signal processor 120 may provide information indicative of one or more network parameters to a display 140. Display 140 may then be viewed by a wireless networking user.

The display may provide wireless networking information to the user. For example, the display may indicate at least one of a signal strength, direction to access point, wireless network name, security level, and internet accessibility of one or more networks.

Direction information may be acquired in embodiments incorporating multiple antennae, such as the embodiment illustrated in FIG. 1. Direction information may be determined by comparing signal strength corresponding to a first wireless network at first antenna 110A to signal strength corresponding to the first wireless network at second antenna 110B. More antennae may be used to provide more accurate direction information. Additionally, positioning antenna 110A away from antenna 110B in device 100 may provide more accurate direction information than if they are positioned close to each other in device 100. In some embodiments, six antennae may be positioned in a star configuration, with an angular spacing of about sixty degrees.

Direction information may be displayed to a user, so that the user may move toward a region of higher signal strength, if desired. Device 100 may display direction information in a number of ways. For example, device 100 (or a user device receiving direction information from device 100) may display an arrow indicating the direction of the source of the wireless signal. Direction information enables the user to move to a location with improved wireless characteristics.

In some embodiments, the system may use information in an 802.11 beacon from one or more wireless sources (according to the 802.11 standard) to determine one or more network parameters. Each wireless access point sends out a beacon containing information of the access point's associated network setting(s). For example, the network information may include a network name and security setting for the associated network.

Figure 2A:
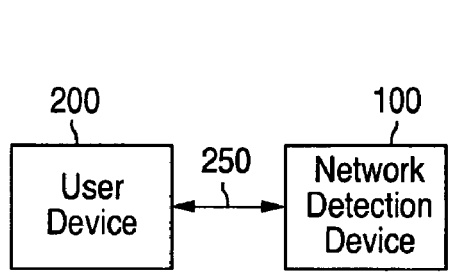
FIG. 2A is a schematic diagram of one connection configuration for a network detection device and a user device, according to some embodiments.

In some embodiments, device 100 may be an entirely stand-alone product (i.e., not connected to a user device such as a personal computer with Wi-Fi capability, cell phone with Wi-Fi capability, or the like). In other embodiments, device 100 may be integrated with a user device in a number of ways. FIG. 2A shows a first embodiment, in which device 100 is external to a user device 200 to be wirelessly connected to a network. Device 100 is in communication with user device 200 via a connection 250.

In one example, device 100 may be integrated with a Wi-Fi USB adapter, which can include an LCD screen to display network information (e.g., an identifier such as an SSID, signal strength, encryption status, Internet connectivity, direction, etc.). Device 100 may be powered by a rechargeable battery which can be charged when device 100 is plugged into the user device and used as a Wi-Fi adapter.

Figure 2B:
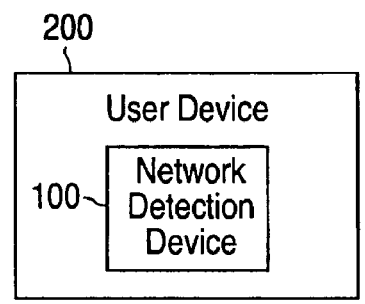
FIG. 2B is a schematic diagram of a different connection configuration for a network detection device and a user device, according to some embodiments.

FIG. 2B shows another embodiment, where device 100 is at least partially integrated with user device 200. For example, user device 200 may be a cell phone with Wi-Fi capability. Device 100 may be internal to user device 200, and may present wireless network information to a user via the user device (e.g., cell phone) display.

Figure 3:
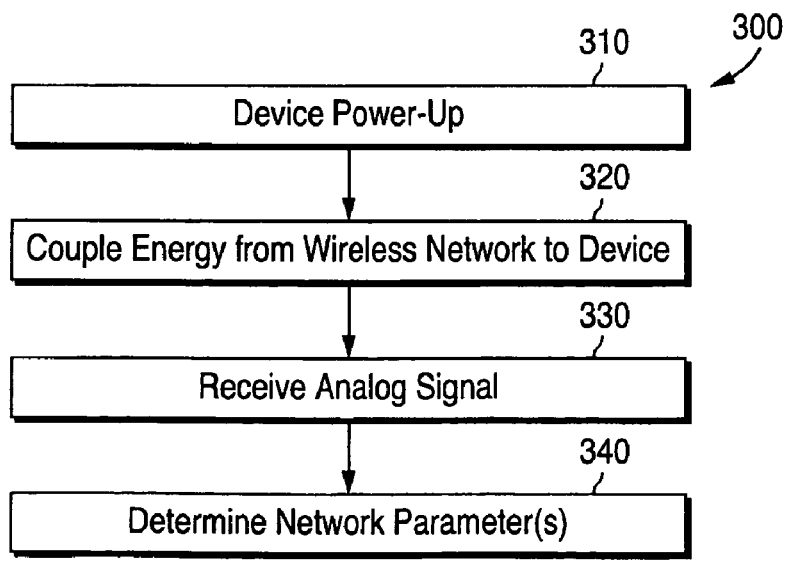
FIG. 3 is a flow chart showing a method for determining one or more wireless networking parameters, according to some embodiments.

FIG. 3 is a flow chart showing a method 300 for detecting one or more wireless networks, according to some embodiments. At 310, a user may power up a network detection device such as device 100 of FIG. 1. The device may be powered up separately from an associated user device, or may receive power from the user device.

At 320, electromagnetic energy from one or more wireless networks may be coupled to the device via one or more antennae of the device. At 330, an analog signal may be received, from each of the antennae, and one or more network parameters for the wireless networks may be determined at 340.

A number of implementations have been described. Although only a few implementations have been disclosed in detail above, other modifications are possible, and this disclosure is intended to cover all such modifications, and most particularly, any modification which might be predictable to a person having ordinary skill in the art.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A device comprising:
   a first antenna configured to couple a wireless signal from a first source to the device and to transmit a first signal indicative of the wireless signal from the first source;
   a second antenna configured to couple the wireless signal to the device and to transmit a second signal indicative of the wireless signal; and
   a processor in communication with the first antenna and the second antenna, the processor configured to process information indicative of the first signal and information indicative of the second signal to determine information indicative of one or more network parameters for the first source, wherein the information indicative of the one or more network parameters for the first source comprises information indicative of a direction of the first source from the device, and wherein the device is configured to transmit information indicative of the direction of the first source to a display.

2. The device of claim 1, further including the display, and wherein the information indicative of the one or more network parameters for the first source comprises information indicative of a signal strength of the first source.

3. The device of claim 1, wherein the information indicative of the one or more network parameters for the first source comprises at least one of a network identifier associated with the first source and a security status associated with the first source.

4. The device of claim 1, wherein the processor comprises a signal processor configured to down-convert a frequency of the first signal to generate a down-converted first signal.

5. The device of claim 1, wherein the processor comprises an analog to digital converter, and wherein the device further comprises a data processor.

6. The device of claim 5, wherein the device further includes one or more memories configured to store instructions to be executed by the data processor, wherein the instructions include instructions to determine the information indicative of the direction.

7. The device of claim 1, further including a power supply in communication with the processor, and wherein the device is a standalone device.

8. A system comprising:
   a user device; and
   a network detection device in communication with the user device, wherein the network detection device comprises:
      a first antenna configured to couple a wireless signal from a first source to the device and to transmit a first signal indicative of the wireless signal from the first source;
      a second antenna configured to couple the wireless signal to the device and to transmit a second signal indicative of the wireless signals;
      a processor in communication with the first antenna and the second antenna, the processor configured to process information indicative of the first signal and information indicative of the second signal to determine information indicative of one or more network parameters for the first source, wherein the information indicative of the one or more network parameters for the first source comprises information indicative of a direction of the first source from the device, and wherein the network device is configured to transmit information indicative of the direction of the first source to a display.

9. The system of claim 8, wherein the user device comprises a personal computing device.

10. The system of claim 8, wherein the user device comprises a cell phone.

11. The system of claim 8, wherein the network detection device is integrated with a wireless networking adapter.

12. The system of claim 8, wherein the network detection device is a standalone device separate from the user device.

13. A network detection device comprising:
   a first antenna configured to couple a wireless signal from a first source to the device and to transmit a first signal indicative of the wireless signal from the first source;
   a second antenna configured to couple the wireless signal from the first source to the device and to transmit a second signal indicative of the wireless signal from the first source;
   a processor in communication with the antenna, the processor configured to process information indicative of the first signal to determine information indicative of one or more network parameters for the first source; and
   wherein the processor for the network detection device is not configured to transmit and receive information on an information communication connection with the first source.

14. The device of claim 13, further including a dedicated power source for the device, and wherein the device is a stand-alone network detection device.

15. The device of claim 13, wherein the device is in communication with a user device including a processor configured to transmit and receive information on an information communication connection with the first source.

16. The device of claim 13, wherein the device is included in a housing of a user device including a processor configured to transmit and receive information on an information communication connection with the first source.

17. The device of claim 16, wherein the user device is a personal computer comprising a microprocessor to execute instructions for a boot up process associated with an operating system, and wherein the device is configured to determine the one or more network parameters prior to the boot up process.

18. The device of claim 13, further comprising at least one additional antenna, and wherein the information indicative of one or more networking parameters comprises direction information indicative of a direction of the first source from the device.

19. A device comprising:
   means for generating a first analog signal from a received wireless signal, the received wireless signal generated by a first source associated with a first network;
   means for generating a second analog signal from the wireless signal; and
   means for processing the first analog signal and the second analog signal to determine information indicative of one or more network parameters for the first source, wherein the information indicative of one or more network parameters for the first source comprises direction information indicative of a direction of the first source from the device, and wherein the device is configured to transmit information indicative of the direction of the first source to a display.

20. The device of claim 19, wherein the means for processing the first analog signal and the second analog signal comprises signal processing means.

21. The device of claim 19, wherein the means for processing the first analog signal and the second analog signal comprises data processing means.

22. The device of claim 19, further comprising display means for displaying network information associated with at least some of the one or more network parameters.

23. The device of claim 19, further comprising power supply means in communication with the means for processing, and wherein the device is a standalone device.

* * * * *